Figure 1:
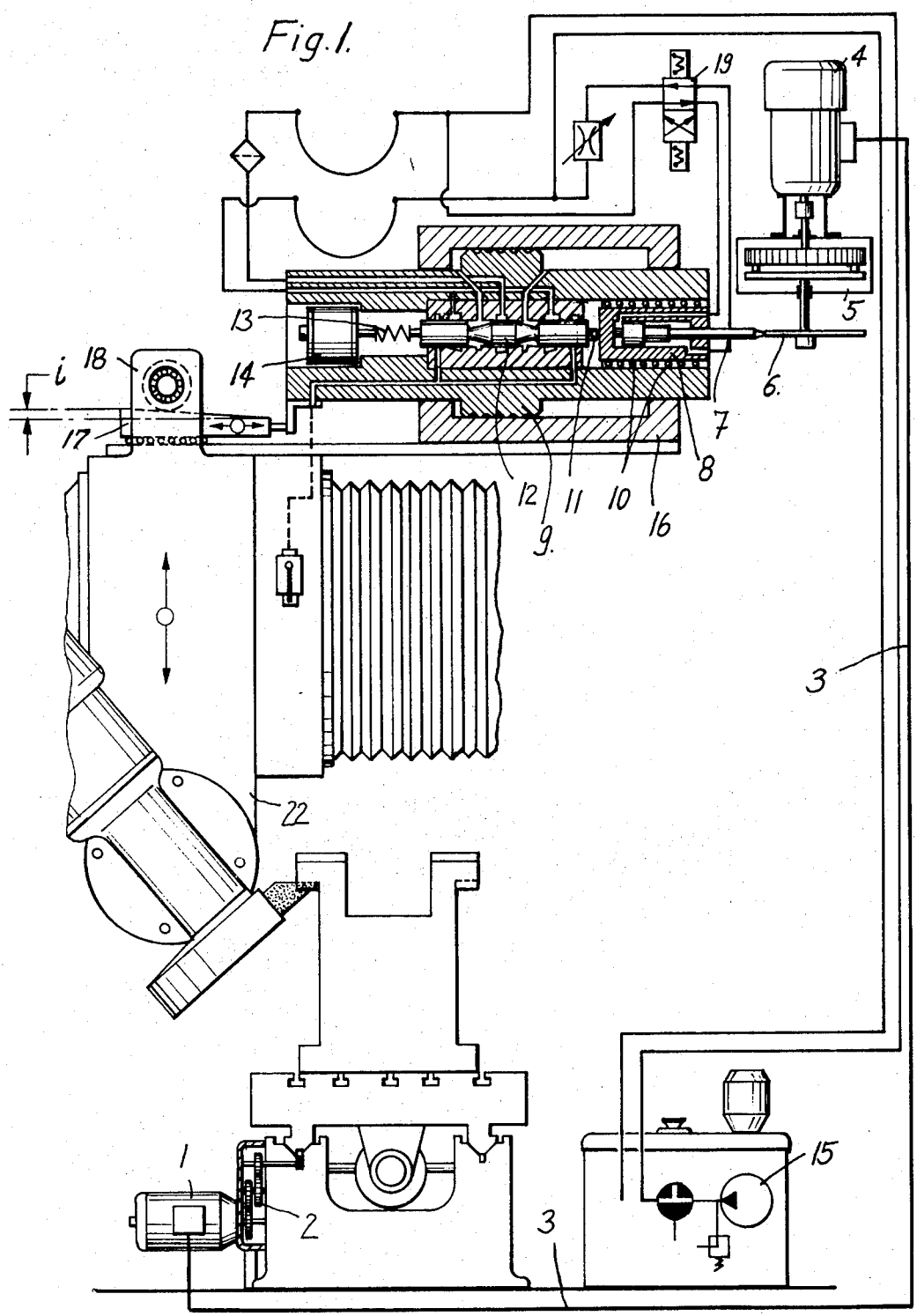

United States Patent [19]
Gerner et al.

[11] 3,846,941
[45] Nov. 12, 1974

[54] CONTROL FOR A LIFTING MECHANISM FOR A HYDRAULIC COPYING DEVICE ON MACHINE TOOLS

[75] Inventors: Heinz Gerner, Coburg; Rudolf Merkel, Scheuerfeld, both of Germany

[73] Assignee: Werkzeugmaschinenfabrik Adolf Waldrich Coburg, Coburg, Bavaria, Germany

[22] Filed: July 20, 1972

[21] Appl. No.: 273,624

[30] Foreign Application Priority Data
July 22, 1971 Germany.............................. 7128109

[52] U.S. Cl............................. 51/165.89, 51/101 R
[51] Int. Cl............................................... B24b 7/02
[58] Field of Search......... 51/100 R, 101 R, 165.89, 51/165.71; 125/11 PH

[56] References Cited
UNITED STATES PATENTS
| | | | |
|---|---|---|---|
| 2,646,651 | 7/1953 | Wilson | 51/100 R |
| 2,720,130 | 10/1955 | Chang | 125/11 PH |
| 2,838,884 | 6/1958 | Balsiger | 51/101 R |

*Primary Examiner*—Harold D. Whitehead
*Attorney, Agent, or Firm*—Woodhams, Blanchard & Flynn

[57] ABSTRACT

A lifting mechanism for a hydraulic copying device for machine tools, having a rectilineal sliding tracer scanning the outline of a template and a control piston connected with the tracer which controls the supply of pressure medium from a pump to the working piston causing the adjusting movement of the tool. The tracer is in a bushing which slides in a direction corresponding to the movement of the tracer and movable against stops on both sides. The bushing is connected with a reversing valve which controls the supply of pressure medium thereto from a pump which effects the adjusting movement of the tool.

6 Claims, 2 Drawing Figures

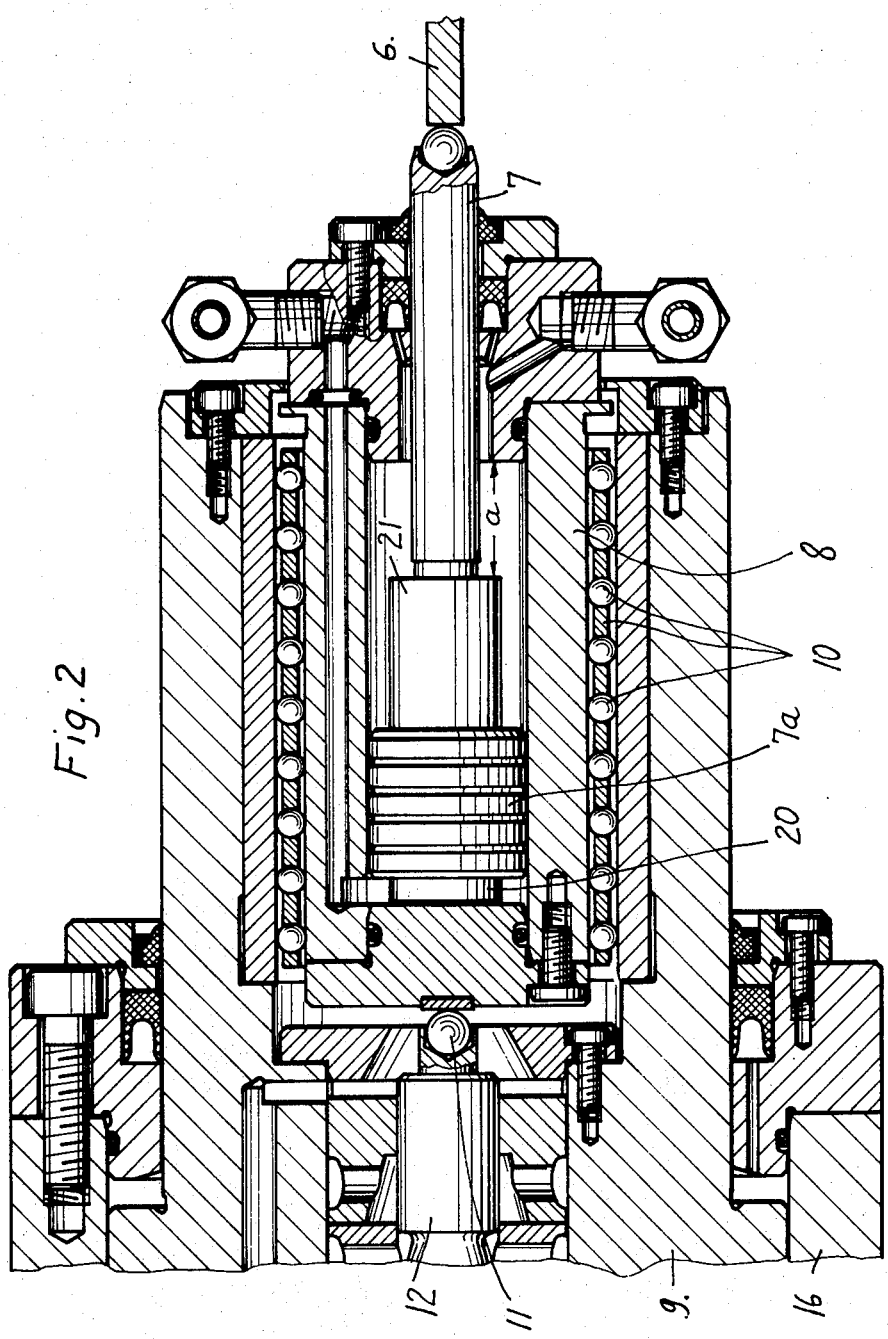

CONTROL FOR A LIFTING MECHANISM FOR A HYDRAULIC COPYING DEVICE ON MACHINE TOOLS

The innovation relates to a lifting mechanism for a hydraulic copying device for machine tools, especially flat grinding machines, with a rectilineal sliding tracer scanning the outline of a template and a control piston connected with the tracer, which controls the supply of pressure medium from a pump to the working piston effecting the adjusting movement of the tool.

A lifting mechanism of this kind serves to lift the tool by a certain amount from the workpiece during the return stroke of the table and so to bring it out of gear, which is required especially in machining processes with high accuracy requirements, as in grinding, owing to the hysteresis error occuring when the sliding carriage of the tool turns to reverse direction.

In a known lifting mechanism of the kind mentioned at the outset, which is employed in planing machines, when the table begins to reverse at the end of a forward stroke, the tracer or control piston is moved by a power magnet, so that the tracer is brought out of contact with the template, or the control piston into a position which moves the toolbearer away from the workpiece. At the end of the return stroke of the table, the current is cut from the power magnet, so that the tracer resumes contact with the template or pattern and the control piston is once more in its hydraulic centre-position. In the following forward stroke, the tool-bearer is again placed by the working piston, according to the directions of the tracer, in a position corresponding to the form of the template. With this device too, the lifting movement serves the need to avoid hysteresis losses brought about by friction of the point of the tracer on the template and the adjusting and positioning mechanisms. A disadvantage, however, is that the tool-bearer can only be moved in one direction, since in the other direction the control piston rests on the tracer and the tracer on the template.

A hydraulic copying device is also known (through German Pat. No. 1 269 867) in which the hysteresis error is correspondingly reduced, though not excluded, by a support mechanism with a high support ratio. In curved grinding of lathe-beds and the like, where for example an elevation of 0.005 or 0.008 mm is required, a deviation of 0.001 or 0.002 mm is already too great. For this reason, with this known copying device also, a lifting mechanism is required where there are high accuracy requirements.

The problem underlying the innovation is to create a lifting mechanism of the type mentioned at the outset which allows the tool to be lifted from the workpiece during the return stroke of the table, in two opposite directions at choice.

This is achieved according to the innovation in that the tracer is arranged in a bushing, sliding in the direction of movement of the tracer, so as to be movable against stops on both sides; in that the bushing is connected with the control piston and presents an operating device which moves the tracer at choice into one of its end positions against the stops.

With this lifting mechanism, depending on the preselection made, the tracer is brought into its first end-position during the forward stroke and into its second end-position during the return stroke. This results, as described in closer detail below, in the tool being raised "upwards". If, on the other hand, the tool is to be raised in the opposite direction, namely, "downwards", the tracer is brought by preselection into its second end-position during the forward stroke and into its first end-position during the return stroke. In this process, the sliding of the tracer in the bushing is effected by means of an operating device.

In a further embodiment of the innovation, the bushing may suitably take the form of a hydraulic cylinder and the tracer that of a double-action piston, connected to the pump by means of a reversing valve. In this way, a lifting mechanism is created which is particularly simple in construction, in which the tracer is moved hydraulically into either of its two end-positions at choice.

Further advantages and peculiarities of the innovation are given in greater detail below, with reference to an example of a method by which it may be performed, illustrated in the accompanying drawings.

They show:

FIG. 1 the diagrammatic representation of a hydraulic copying device for curved grinding with the lifting mechanism according to the invention, FIG. 2 details of the lifting mechanism in axial section.

An example of a method by which the innovation may be performed is shown in the drawings, in which the copying device with the lifting mechanism is arranged on the support of a sliding-guide grinding machine. The copying device, known in itself, is so constructed that the movement of the table is transmitted by the transmission mechanism 2 with the transmitter 2 through the schematically illustrated electrical connection 3, the receiver 4 with the template reduction gear 5 to the template. The gearing ratios are so determined that on the maximum table-stroke, the template 6 turns by a maximum of 360° approx. The template is scanned by a tracer 7 which is in the form of a double-action piston 7a arranged so as to slide in the cylinder 8. The tracer 7 and piston 7a present stops 20 and 21 respectively, which limit the movement of the piston 7a in both directions, the piston moving by the amount a out of its left end-position into its right end-position and vice versa. The cylinder 8 is suitably placed so as to slide axially in a ball bushing 10 in the working piston 9. The cylinder 8 is connected by a ball 11 with the control piston 12, and constant contact between the two parts is obtained by means of the pressure spring 13 which presses one end of the control piston 12 towards the tracer. By means of the motor 14, the control piston 12 is constantly rotated in known manner, thereby diminishing the friction on its axial adjustment and allowing a momentary reverse movement at the least axial sliding movements. The control piston 12 with the oil-ducts is known in itself and owing to its symmetrical construction possesses a hydraulic centre-position.

In the drawing, the tracer 7 and the cylinder 8 are represented during the forward stroke. In this case, the piston 7a rests with its stop 20 on the base of the cylinder 8. By rotation of the template 6, the tracer 7, through the cylinder 8, moves the control piston out of its neutral centre-position. At the same time, the oil supplied by the pump 15 is supplied through two control ducts to the copying cylinder 16 and the working piston 9 is moved in the desired direction. This movement continues until, by means of the hydraulic feedback, the control piston is returned to its centreposition. The working piston operates the grinding spindle bearer 22 through the copying wedge 17 and the slide-piece 18.

When the changeover from forward to return stroke occurs, the reversing valve 19 is changed over at the same time and, as a result, the left-hand piston surface of the double-action piston 7a is brought into play. In this way the cylinder 8 is moved to the full extent a to the left, and at the same time the control piston 12 is brought out of its neutral centreposition. As a result, the working piston 9 is moved away from the template 6 by the same amount a. By switching back the wedge mechanism 1/i, the movement is transmitted to the grinding spindle bearer 22, so that the grinding wheel describes a path, controlled by the template 6 and removed downwards from the workpiece by the amount a/i. At the end of the return stroke of the table, the piston 7a is brought back into its original position, shown in FIG. 2, this being effected by operating the reversing valve 19 again.

If, in machining another surface of the workpiece, it is necessary to lift the tool upwards during the return stroke of the table, then during the forward stroke, the piston 7a is brought into its right end-position by operating the reversing valve 19, so that it rests with its stop 21 against the corresponding opposing surface of the cylinder. During the return stroke of the table, the piston 7a with its stop 20 is then, on the contrary, moved into its left end-position. Depending on whether it is required to lift the grinding wheel "upwards" or "downwards", the reversing valve 19 is brought, by means of a selecting switch not shown, into one or the other of its positions, and as a result the piston 7a rests with its stops 20, 21 either in its right or left end-position during the forward stroke.

The embodiments of the invention in which an exclusive property or privilege is claimed are defined as follows:

1. A lifting mechanism for use in a hydraulic copying device for machine tools, having a rectilineal sliding tracer scanning the outline of a template and a control piston connected with the tracer which controls the supply of pressure medium from a pump to the working piston effecting the adjusting movement of the tool, the improvement comprising:

means defining a cylinder supported for axial slidable movement in a direction parallel to the movement of said tracer, said tracer being axially slidably supported for movement on said cylinder means;

means defining a pair of axially spaced stops adapted to limit the relative sliding movement between said slidable cylinder means and said tracer;

means defining a control piston engaging said cylinder means; and operating means for selectively controlling the relative sliding movement between said cylinder means and said tracer to the limits defined by said stop means.

2. The improvement according to claim 1, wherein the cylinder means is in the form of a hydraulic cylinder;

wherein the tracer includes a double-action piston mounted in said cylinder; and wherein said operating means includes a fluid pump and reversing valve means for controlling the side of said double-action piston to which fluid from said pump is supplied.

3. The improvement according to claim 1, wherein said control piston means comprises a hollow working piston slidably mounted in a copy cylinder; and wherein said cylinder means is adapted to slide inside said hollow working piston.

4. The improvement according to claim 2, including a control piston slidably disposed in said hollow working piston and resilient means for urging said control piston in the direction of said template into engagement with one end of said cylinder.

5. The improvement according to claim 4, including a ball positioned between said control piston and said cylinder.

6. The improvement according to claim 1, wherein said stop means are mounted on said tracer and movable therewith.

* * * * *